May 19, 1959 R. L. LICH 2,887,069
AIR SPRING RAILWAY TRUCK
Filed Dec. 15, 1955 2 Sheets-Sheet 2

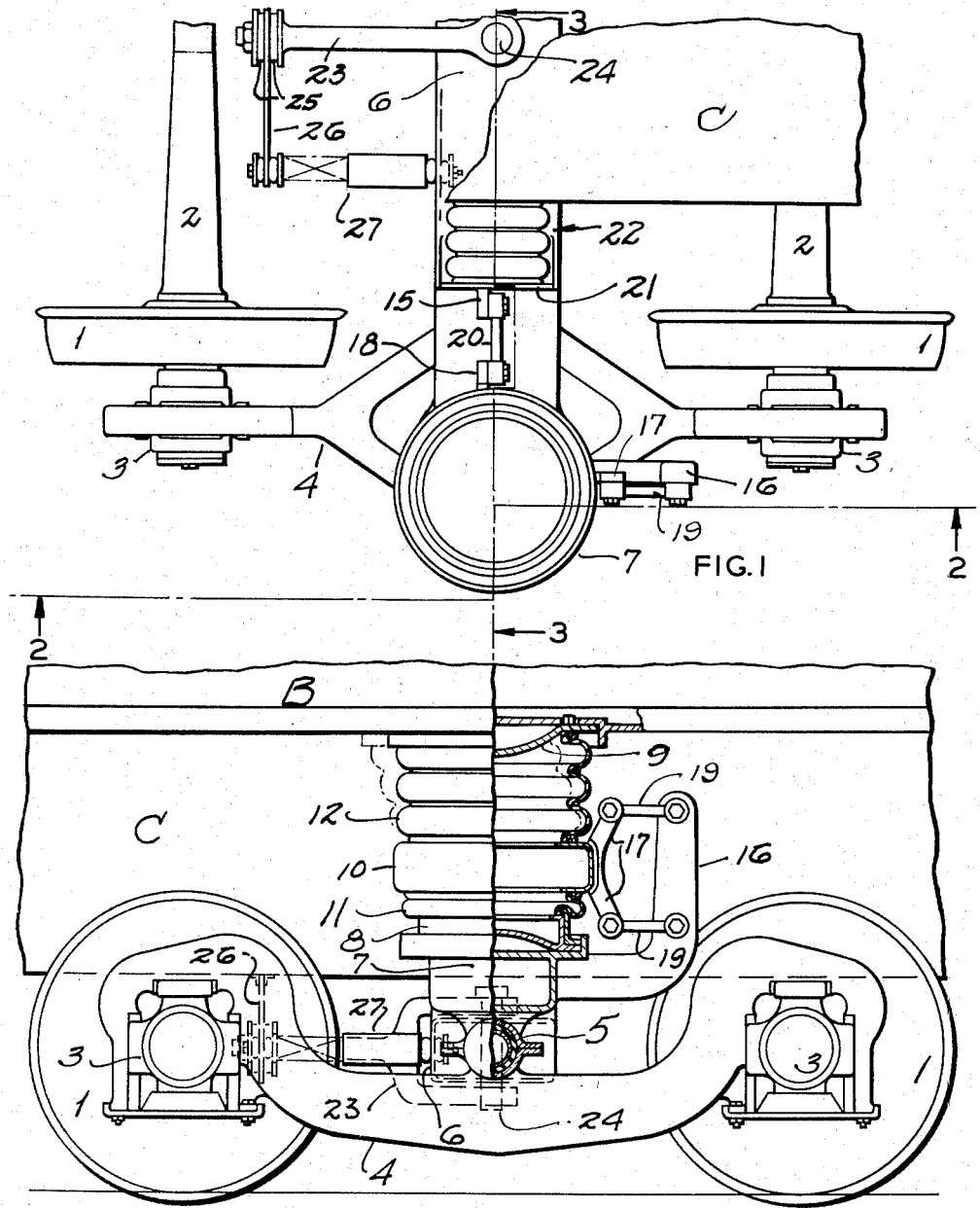

INVENTOR.
Richard L. Lich
BY Rodney Bedell
atty.

United States Patent Office 2,887,069
Patented May 19, 1959

2,887,069
AIR SPRING RAILWAY TRUCK

Richard L. Lich, Ferguson, Mo., assignor to General Steel Castings Corporation, Granite City, Ill., a corporation of Delaware Application December 15, 1955, Serial No. 553,362

11 Claims. (Cl. 105—199)

The invention relates to springs of bellows type embodying a closed chamber with a side wall of flexible material and filled with air or other gaseous fluid under pressure. The invention relates more paritcularly to the combination of a spring of the type indicated with railway vehicle parts movable relative to each other, the spring being arranged to support the vehicle load, as generally illustrated in an application filed by the present applicant August 29, 1955, Serial No. 531,236.

Spring structures of the type described in the application mentioned are not adapted to accommodate substantial relative shifting of spring-supporting and spring-supported members transversely of the spring axis. Accordingly, such a spring is not well adapted for some railway vehicle supporting structures arranged to accommodate swiveling of the vehicle trucks relative to the vehicle body on curved track and relative movement of the vehicle body and truck transversely of the track due to lateral forces applied in opposite directions to the truck and vehicle body.

The main object of the present invention is to adapt an air spring for accommodating relative movements transversely of its axis by a spring seat part and a spring cap part. This object is attained by the provision of an intermediate wall section of substantially rigid material between the spring seat and cap parts, the intermediate wall section being connected by flexible wall portions with the seat and cap parts and the intermediate wall section being movable transversely of the spring axis relative to at least one of the seat and cap parts by distortion of the flexible wall.

Another object is to combine the advantages of a single convolution bellows section and a multiple convolution bellows section; that is, to obtain the flexibility in transverse distortion of a longer bellows section and the low frequency of the shorter bellows section without requiring a large surge chamber.

In the accompanying drawings illustrating selected embodiments of the invention:

Figure 1 is a top view of one longitudinal half of a four-wheel truck mounting a vehicle body supporting air spring adapted to permit relative movement of the truck and body transversely of the spring axis.

Figure 2 is a side view and vertical longitudinal section on line 2—2 of Figure 1, a shifted position of the spring and supported structure being indicated in broken lines. A portion of the body center sill is indicated.

Figure 3:
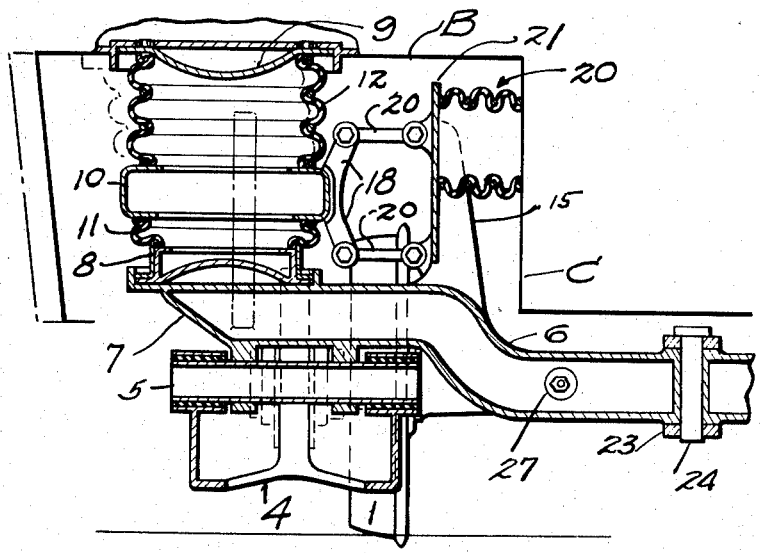
Figure 3 is a transverse vertical section of the structure on line 3—3 of Figure 1, a shifted position of the spring and supported structure being indicated in broken lines.

The truck shown in Figures 1–3 includes wheels 1, axles 2, with journal boxes 3, and equalizers 4 extending between corresponding journal boxes. Each equalizer includes a widened central poriton forming spaced bearings for trunnions 5 of a transverse transom 6.

The transom forms a support 7, above the trunnions at each side of the truck for an air spring which includes a vertically extensible chamber having a seat part 8, a cap part 9, an intermediate wall part 10, and bellows-like walls 11 and 12, respectively, connecting part 10 to parts 8 and 9. Parts 8, 9, and 10 are of relatively rigid material and walls 11, 12 are of relatively flexible material. Wall 11 comprises a single convolution. Wall 12 comprises a plurality of convolutions. Part 8, 9, 10, and 11 form a single chamber for compressible fluid.

Adjacent to each spring support, transom 6 is provided with upstanding brackets 15 and 16. The spring intermediate wall 10 has rigid arms 17 and 18 disposed 90° apart about the spring axis. Substantially horizontal links 19 pivotally connect arms 17 with bracket 16 and similar links 20 pivotally connect arms 18 with transom bracket 15. The function of elements 15, 16, 17, 18, 19, 20 is to hold the intermediate cylindrical wall 10 parallel to and in vertical alignment with the seat part 8 while permitting relative vertical movement of parts 10 and 8. The cap part 9 supports the vehicle body indicated at B and shifts relative to the remainder of the spring structure when the body and truck move on curved track or are subject to forces resulting from other reasons and applied in opposite directions transversely of the spring axis.

Links 19 accommodate vertical spring action but hold parts 8 and 10 against movement lengthwise of the truck. When the truck and body swivel relative to each other, the plural-convolution upper part of the spring is distorted as indicated in broken lines in Figure 2. When the body and truck move relative to each other transversely of the track, parts 8 and 10 remain aligned vertically, but parts 9 and 10 shift transversely of the track as indicated in broken lines in Figure 3.

Horizontally disposed air springs 22 between the body center sill C and upstanding webs 21 on the transom brackets 15 yieldingly resist the lateral shifting of the body and truck and tend to return them to normal centered position when a shifting has occurred.

Relative movement of the truck and body longitudinally of the vehicle is prevented by a link 23 pivoted at 24 to the truck transom and anchored through pads 25 of rubber-like material clamped to opposite sides of a bracket 26 depending from the car sill C. Swiveling of the truck about pin 24 is yieldingly resisted by snubbers 27 pivotally connected to transoms 6 and to bracket 26.

Elements 23, 24, 25, 26, and 27 make it unnecessary for the main air springs to resist relative movement of the sides of the body and the sides of the truck longitudinally of the vehicle.

Accordingly, while the main upright air spring supports the load, it does not need to offer resistance to movements transversely of its axis in any direction.

Figure 4:
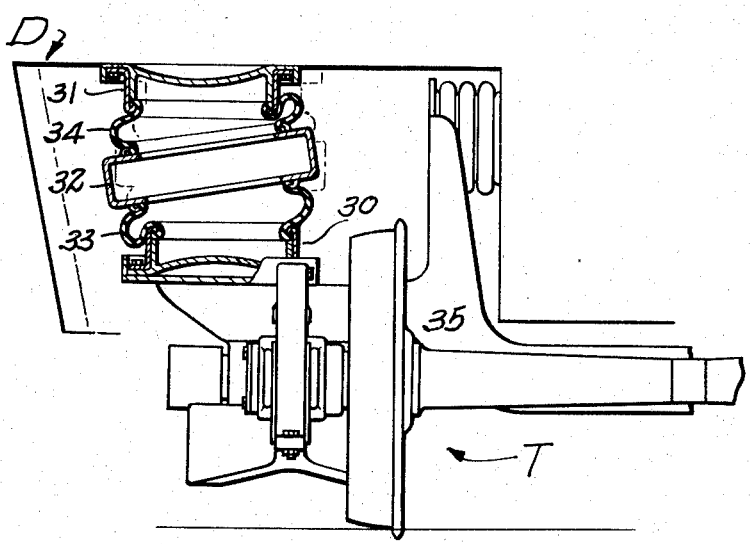
Figure 4 is a similar section and view illustrating another form of the invention with the truck and body shifted transversely of the spring axis from a normal position, the latter being shown in broken lines.

Figure 4 illustrates another form of the invention in which the truck T and body D are substantially the same as previously described and the air spring has a lower cylinder 30, an upper cylinder 31, an intermediate cylinder 32 and single convolution walls 33 and 34 below and above the intermediate cylinder. In this arrangement there is no linkage connecting the intermediate cylinder to the truck transom 35 or to the vehicle body, but intermediate cylinder 32 may tilt about the spring axis and the upper and lower cylinders may shift transversely of the spring axis without lateral distortion of the bellows-like walls 33, 34. The latter merely expand and contract, lengthwise of the spring, at opposite sides of the spring to effect a rolling action of each convolution during lateral distortion of the spring.

The details of the structure may be varied substantially

What is claimed is:

1. A vehicle pneumatic spring structure comprising a vertically extensible pneumatic chamber including top and bottom end members and a hollow intermediate member, said members being spaced from each other, and flexible side walls between said members, means for securing the lower end member to a vehicle wheel mounting structure to hold said lower end member and the mounting structure against relative transverse movement, the upper end member forming a support for a load-carrying structure and being movable transversely of said lower end member independently of said means and thereby accommodating relative lateral play of said upper and lower end members, by distortion of said side walls, irrespective of relative vertical movement of said end members, the intermediate member being provided with laterally projecting pivoted means for anchoring the intermediate member to one of the structures to which one of the end members may be secured.

2. A pneumatic spring structure according to claim 1, in which the connections between adjacent members are of bellows-like form and accommodate tilting of the intermediate member, relative to the longitudinal axis of the spring, and the intermediate member is wider than the hollow connections.

3. A vehicle pneumatic spring structure according to claim 1, in which the laterally projecting pivotal means on the intermediate member comprises an elongated link pivoted at one end to the intermediate member and extends therefrom transversely of the spring axis and includes a pivot terminal at its outer end.

4. A vehicle pneumatic spring structure according to claim 1, in which the laterally projecting pivotal means comprises separate links pivoted to the intermediate member at points spaced lengthwise of the spring and extend from their respective pivots transversely of the spring axis in substantially the same general direction, said links including pivot terminals at their outer ends for attachment to associated structure.

5. A vehicle pneumatic spring structure according to claim 1, in which the flexible side wall between the intermediate member and each of the end members is of bellows-like form, one of said connections having a plurality of convolutions and the other of said connections having a single convolution.

6. In combination, a railway truck structure provided with a spring seat, a pneumatic spring mounted thereon, a load-carrying structure supported on said spring, said structures being shiftable horizontally relative to each other, said spring including end members of rigid material, secured respectively to said structures, an intermediate member of rigid material, and a wall of flexible material connecting the intermediate member and each of said end members, there being link-like means pivoted at one end to the intermediate member and at the other end to one of said structures and holding the intermediate member and the link-connected structure against shifting relative to each other transversely of the spring axis.

7. In a railway vehicle truck, a wheel supported frame structure provided with a spring seat, a pneumatic spring mounted thereon, a load-carrying structure supported on said spring, said spring including vertically spaced end members of rigid material, secured respectively to said structures, said spring also including a member of substantially rigid material, intermediate said end members, and a wall of flexible material connecting the intermediate member and each of said end members, said structures being movable relative to each other longitudinally and transversely of the spring axis, said intermediate member being inclinable to the spring axis by the yielding of the flexible wall to accommodate said relative movement.

8. In a railway vehicle, a wheel-supported structure, a pneumatic spring structure mounted thereon and comprising at least three vertically spaced rigid cylinders, flexible wall connections between adjacent cylinders, a load-carrying structure supported upon the upper cylinder and movable vertically and transversely of the wheel-supported structure, by the distortion of the spring structure, and means pivotally anchoring the intermediate cylinder to one of said structures.

9. In combination with a railway vehicle truck wheel-supported structure and load-carrying structure, a pneumatic spring supporting the latter structure from the former structure and comprising at least three vertically spaced rigid cylinders with flexible wall connections between adjacent cylinders, the lower cylinder being secured to the first-mentioned structure, the upper cylinder being secured to the load-supporting structure, and linkage pivotally connecting the intermediate cylinder to one of said structures and holding the linkage-connected parts against substantial horizontal movement relative to each other transversely of the spring axis while accommodating their relative vertical movement.

10. In combination with a railway vehicle body and a supporting truck swiveled thereto, an air spring supporting the body from the truck and comprising a rigid lower cylinder mounted on the truck, and a rigid upper cylinder mounting the vehicle body, and a rigid intermediate cylinder spaced vertically from the lower and upper cylinders, there being flexible walls connecting said cylinders to form bellows-like connections between them to accommodate their relative vertical and angular movements, and linkage pivoted to said intermediate cylinder and to said truck.

11. In combination with a railway vehicle body, a supporting structure comprising a pair of spaced wheel and axle assemblies with journal boxes, equalizers extending between and carried on corresponding journal boxes, a truck frame member extending transversely of the truck and mounted on the equalizers and forming spring seats at opposite sides of the truck there being upstanding arms on said frame member spaced from said spring seats inboard of the truck, an air spring structure mounted on each spring seat and comprising upper and lower cylinders, and an intermediate cylinder, all of rigid material, and bellows-like flexible walls connecting adjacent cylinders and accommodating their movement and inclination relative to each other, and linkage pivoted to each arm and to the adjacent intermediate cylinder and holding the latter against shifting laterally relative to the arm and spring seat.

References Cited in the file of this patent

UNITED STATES PATENTS

| | | |
|---|---|---|
| 1,337,579 | Amory | Apr. 20, 1920 |
| 2,133,279 | Brown | Oct. 18, 1938 |
| 2,427,927 | Schutte | Sept. 23, 1947 |
| 2,537,637 | Candlin, Jr. et al. | Jan. 9, 1951 |
| 2,759,431 | Britton et al. | Aug. 31, 1956 |